United States Patent [19]

Teramachi

[11] Patent Number: 4,598,956
[45] Date of Patent: Jul. 8, 1986

[54] CROSS-LINEAR SLIDE BEARING UNIT

[76] Inventor: Hiroshi Teramachi, 2-34-8, Higashi-Tamagawa, Setagaya-Ku, Tokyo, Japan

[21] Appl. No.: 644,985

[22] Filed: Aug. 28, 1984

[51] Int. Cl.$^4$ .......................................... F16C 29/06
[52] U.S. Cl. ........................................................ 384/45
[58] Field of Search .............. 308/6 C, 6 R, 3 A, 3 R

[56] References Cited

U.S. PATENT DOCUMENTS

| | | | |
|---|---|---|---|
| 3,270,591 | 9/1966 | Winter, IV | 308/3 A X |
| 3,389,625 | 6/1968 | Wagner | 308/3 A X |
| 4,118,101 | 10/1978 | Teramachi | 308/6 C |
| 4,472,003 | 9/1984 | Osawa | 308/6 C |

*Primary Examiner*—Stuart S. Levy
*Assistant Examiner*—Thomas R. Hannon
*Attorney, Agent, or Firm*—Peter L. Berger

[57] ABSTRACT

A cross-linear slide bearing unit for use at an intersection of, for example, a column and a cross rail in a machine tool includes a bearing body having a pair of recesses formed in orthogonal relation to each other with a solid portion interposed therebetween. The bearing body further has loaded ball guide grooves respectively formed in the inner walls of ridges which face the corresponding recesses, and non-loaded ball guide bores formed through the ridges in parallel to the corresponding loaded ball guide grooves and with a necessary distance therefrom. End plates are respectively mounted to end portions of the bearing body. Each end plate is provided in the inner surface thereof with a ball guiding U-groove for providing communication between the non-loaded ball guide bores and the corresponding loaded ball guide grooves. The cross-linear slide bearing unit further includes track rails slidably fitted in the recesses, respectively, of the bearing body through balls. Each track rail is provided in the lateral outer walls thereof with loaded ball raceway grooves which are parallel to the corresponding loaded ball guide grooves. The bearing body may have in its approximately central portion a through hole of any desired shape, while the track rails may be respectively formed with windows which communicate with the through hole.

4 Claims, 8 Drawing Figures

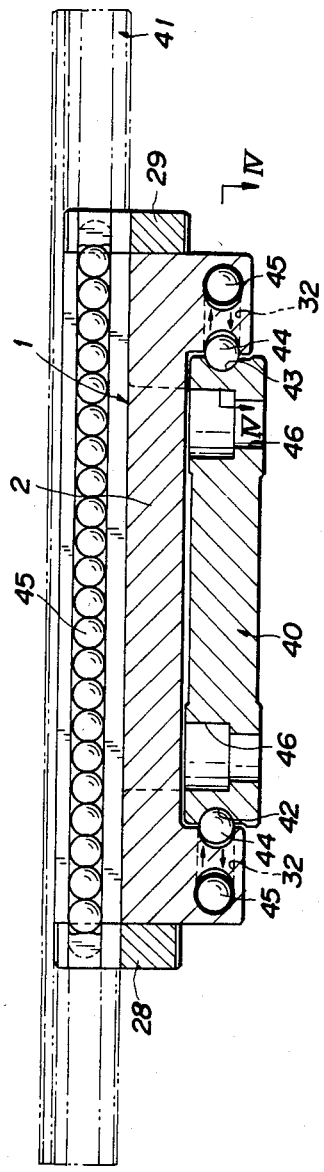
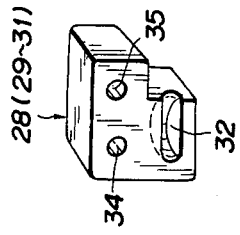
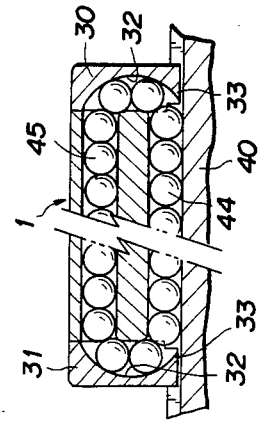
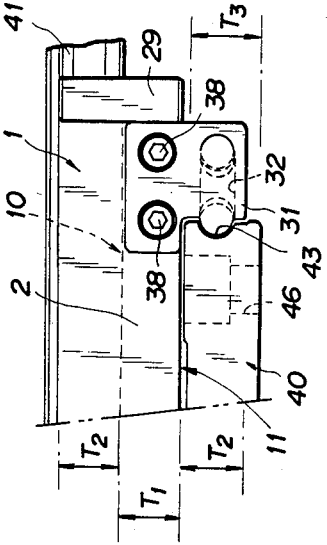

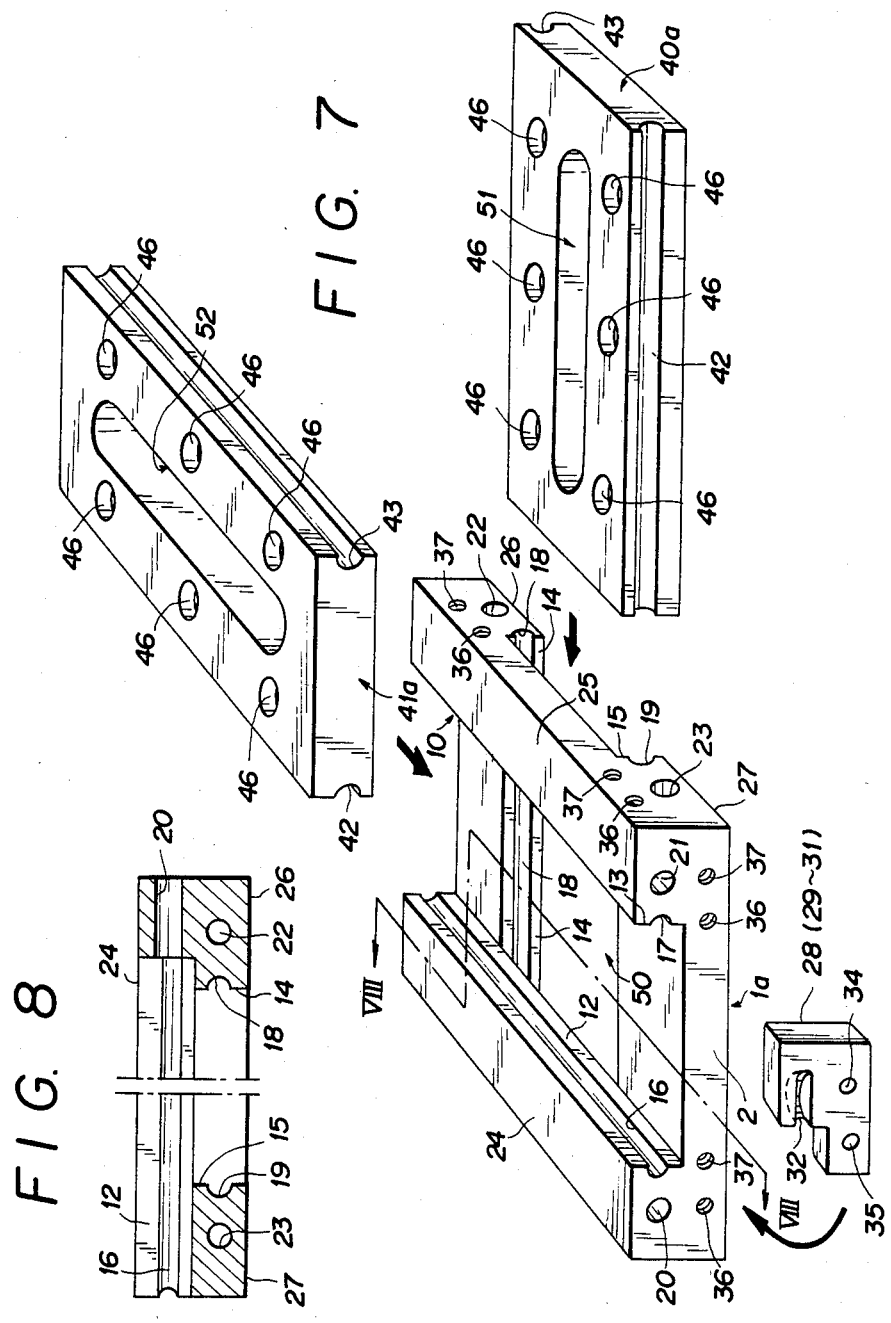

CROSS-LINEAR SLIDE BEARING UNIT

BACKGROUND OF THE INVENTION

The present invention relates to a cross-linear slide bearing unit which is adapted for use at an intersection of a column and a cross rail in a machine tool such as boring or planing machine or at an intersection of vertical and horizontal shafts in a general conveyor such as to support and slide a heavy-weight object.

SUMMARY OF THE INVENTION

It is a primary object of the present invention to provide a cross-linear slide bearing unit in which a bearing body is reduced in wall thickness so that it is possible to reduce the weight of the bearing unit as a whole, to minimize inertia force produced when the bearing unit moves and to allow the bearing unit to cope well with the need for quick motion.

To this end, according to the invention, there is provided a cross-linear slide bearing unit comprising: a bearing body having a pair of recesses formed in orthogonal relation to each other with a solid portion interposed therebetween, loaded ball guide grooves respectively formed in the inner walls of ridges which face the corresponding recesses, and non-loaded ball guide bores formed through the ridges in parallel to the corresponding loaded ball guide grooves and with a necessary distance therebetween; end plates respectively mounted to end portions of the bearing body, each end plate being provided in the inner surface thereof with a ball guiding U-groove for providing communication between the non-loaded ball guide bores and the corresponding loaded ball guide grooves; and track rails slidably fitted in the recesses, respectively, of the bearing body through balls, each track rail being provided in the lateral outer walls thereof with loaded ball raceway grooves which are parallel to the corresponding loaded ball guide grooves.

By virtue of the above-described arrangement, the cross-linear slide bearing unit in accordance with the present invention may possess a reduced wall thickness, so that it is advantageously possible to minimize inertia force produced when the bearing unit moves horizontally or vertically.

Further, since the track rails of the bearing unit are reduced in wall thickness but are increased in width, it is favorably possible to prevent any horizontal or vertical distortion of the track rails, that is, axial distortion or other machining errors produced when the track rails are ground. Thus, a desired degree of accuracy can be attained satisfactorily.

Furthermore, since the bearing body has a relatively wide width, similar to the track rails, it is conveniently possible to simultaneously grind the right and left loaded ball guide grooves by employing a large-sized grinding wheel. Therefore, operating efficiency is greatly increased, and the production cost is favorably reduced. It is, moreover, possible to easily obtain a required degree of accuracy.

Additionally, it becomes possible to further reduce the weight of the bearing unit by forming hollow portions, such as a through hole and slits, in the bearing body and the track rails. In such case, it is conveniently possible to observe the movement of a table mounted on the bearing body by making use of the through hole and slits.

The above and other objects, features and advantages of the invention will become clear from the following description of the preferred embodiments thereof, taken in conjunction with the accompanying drawings.

BRIEF DESCRIPTION OF THE DRAWINGS

FIG. 2 is a sectional front elevational view taken along the line II—II of FIG. 1;

FIG. 3 is a front elevational view of an essential part of the cross-linear slide bearing unit shown in FIG. 1 as viewed in the direction of the arrow A;

FIG. 4 is a sectional side elevational view taken along the line IV—IV of FIG. 2;

FIG. 6 is a perspective view of an end plate employed in the cross-linear slide bearing unit shown in FIG. 1;

FIG. 7 is an exploded perspective view of a second embodiment of the cross-linear slide bearing unit in accordance with the invention; and FIG. 8 is a sectional side elevational view taken along the line VIII—VIII of FIG. 7.

DESCRIPTION OF THE PREFERRED EMBODIMENTS

Figure 1:
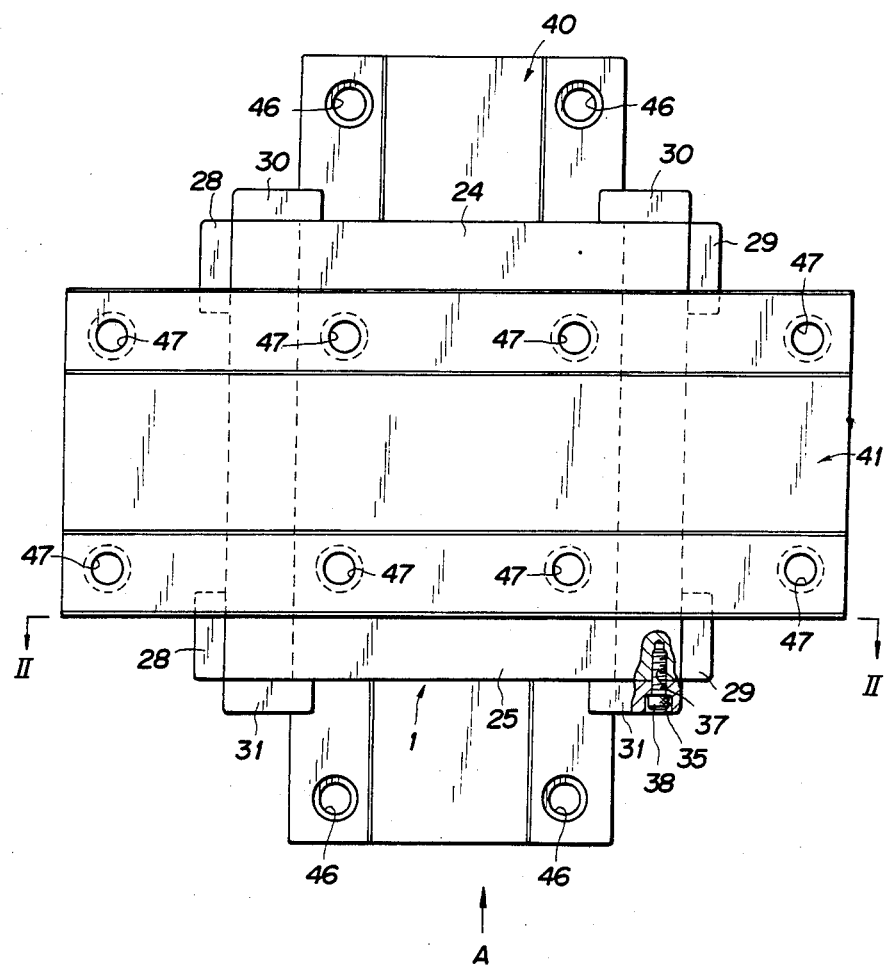
FIG. 1 is a partly-sectioned plan view of a first embodiment of the cross-linear slide bearing unit in accordance with the invention.
Figure 5:
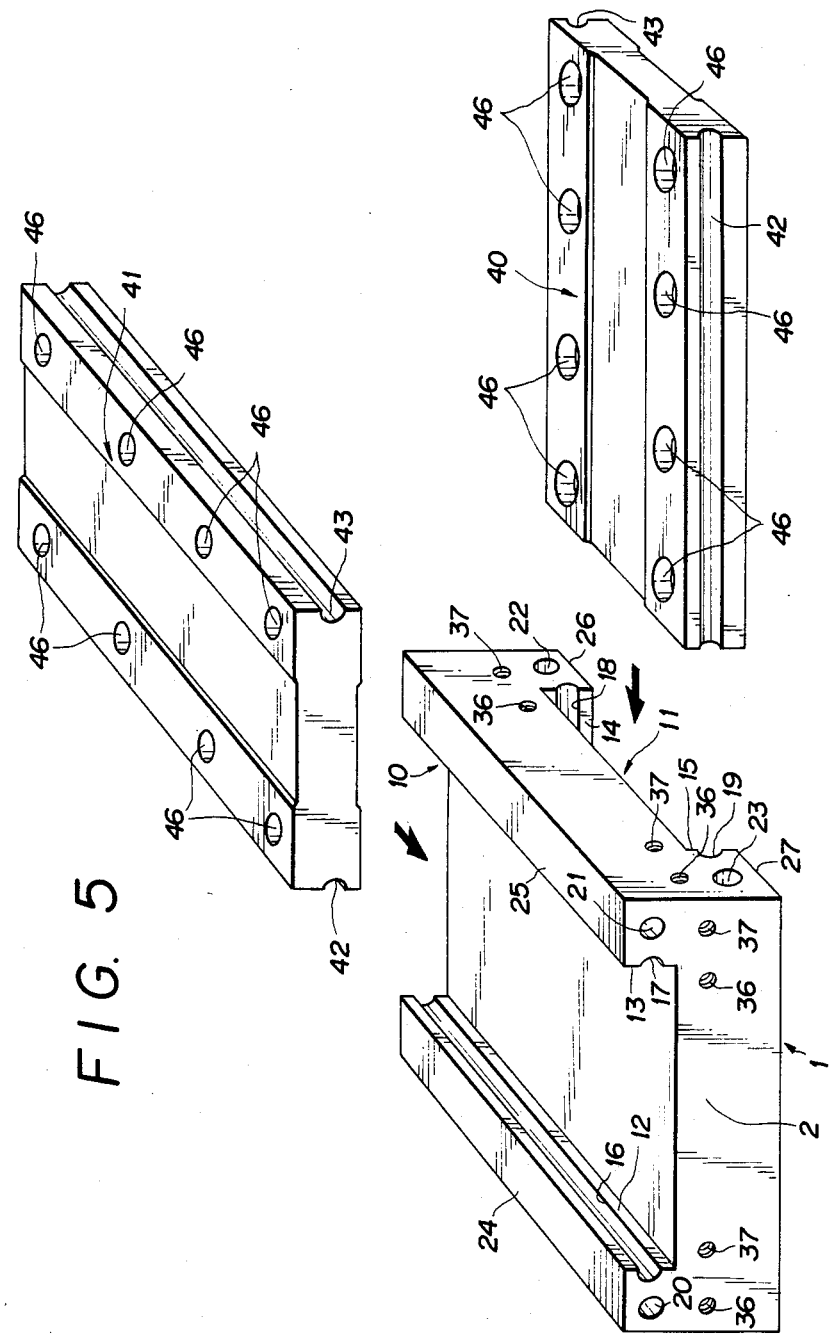
FIG. 5 is an exploded perspective view of a bearing body and track rails employed in the cross-linear slide bearing unit shown in FIG. 1.

Embodiments of the invention will be described hereinunder with reference to the accompanying drawings.

FIGS. 1 to 6 in combination show a first embodiment of the invention. A bearing body 1 is constituted by a block of a substantially rectangular parallelepiped shape. The bearing body 1 is provided in the upper and lower surfaces thereof with recesses 10, 11 which are in orthogonal relation to each other with a solid portion 2 interposed therebetween. The bearing body 1 is formed from a steel material or a composite material which has a strength equal to that of a steel material, or a heat-treated thermoplastic material, for example, polyacetal resin. Further, loaded ball guide grooves 16, 17, 18, 19, each having a curvature slightly larger than that of each of the balls, are respectively formed in the opposing inner walls 12, 13, 14, 15 of the recesses 10, 11.

Non-loaded ball guide bores 20, 21, 22, 23 are respectively formed through ridges 24, 25, 26, 27 which face their respective recesses 10, 11. The non-loaded ball guide bores 20, 21, 22, 23 are formed in parallel to the corresponding loaded ball guide grooves 16, 17, 18, 19 and with a necessary distance therebetween.

End plates 28, 29, 30, 31 are formed from a metallic or nonmetallic material, e.g., a synthetic resin material such as polyacetal resin and nylon resin. Each of the end plates 28, 29, 30, 31 is provided in the inner surface thereof with a ball guiding U-groove 32 for providing communication between the non-loaded ball guide bores 20, 21, 22, 23 and the corresponding loaded ball guide grooves 16, 17, 18, 19. Each of the end plates 28, 29, 30, 31 is further provided on the side thereof which faces the associated loaded ball guide groove with a tongue 33 for smoothly guiding the balls.

Each of the end plates 28, 29, 30, 31 is formed with through holes 34, 35 for receiving mounting bolts. Each of the through holes 34, 35 is subjected to spot facing so as to properly receive the head portion of a mounting bolt.

Female threads 36, 37 are formed in each of the portions of the bearing body 1 which are respectively closer to the ridges 24, 25, 26, 27. The female threads 36, 37 are positioned so as to correspond to the through holes 34, 35 of each of the end plates 28, 29, 30, 31, thereby allowing the female threads 36, 37 and the through holes 34, 35 to align with each other when the bearing unit is assembled. The reference numeral 38 denotes each of the mounting bolts for mounting the end plates 28, 29, 30, 31 to the ridges 24, 25, 26, 27 of the bearing body 1.

Flat and wide-width track rails 40, 41 are formed, similar to the bearing body 1, from a steel material or a composite material which has a strength equal to that of a steel material, or a heat-treated thermoplastic material. The track rails 40, 41 are slidably fitted in the recesses 10, 11, respectively, of the bearing body 1 through balls. The width of the track rails 40, 41 is substantially equal to that of the recesses 10, 11. On the other hand, the thickness of the track rails 40, 41 is selected so that they outwardly project slightly beyond the associated ridges 24, 25, 26, 27 of the bearing body 1.

Each of the track rails 40, 41 is provided in the lateral outer walls thereof with loaded ball raceway grooves 42, 43 which are parallel to the corresponding loaded ball guide grooves 16, 17, 18, 19 of the bearing body 1.

In the drawings, the reference numeral 44 denotes a loaded ball train constituted by a multiplicity of balls interposed between the loaded ball guide grooves 16, 17, 18, 19 of the bearing body 1 and the corresponding loaded ball raceway grooves 42, 43 of the track rails 40, 41. The reference numeral 45 denotes a non-loaded ball train constituted by a multiplicity of balls within the non-loaded ball guide bores 20, 21, 22, 23 in the bearing body 1. The reference numeral 46 denotes each of the through holes for receiving set bolts when the lower track rail 40 is secured to the bed of a machine tool, for example. Further, the reference numeral 47 denotes each of the through holes for receiving set bolts when a table, for example, is secured to the upper track rail 41.

The following is a description of the operation of the cross-linear slide bearing unit having the above-described construction.

The lower track rail 40 mounted on the bearing body 1 through the balls is secured to the bed of a machine tool, for example, through the set bolts, and a table, for example, is secured to the upper track rail 41 through set bolts.

As the bearing body 1 is moved in the direction of the arrow A in FIG. 1 by means of a drive mechanism (not shown) such as a ball screw, the balls between the loaded ball guide grooves 18, 19 and the loaded ball raceway grooves 42, 43 and those within the non-loaded ball guide bores 22, 23 smoothly recirculate through the end plates 30, 31 while changing over their rolling states from one to the other, that is, from the state wherein they roll as the loaded ball train 44 to the state wherein they roll as the non-loaded ball train 45, and vice versa, as shown by the arrow in FIG. 4.

On the other hand, when the table secured to the upper track rail 41 is moved in the direction perpendicular to the direction of the arrow A in FIG. 1, the balls between the loaded ball guide grooves 16, 17 and the loaded ball raceway grooves 42, 43 and those within the non-loaded ball guide bores 20, 21 smoothly recirculate through the end plates 28, 29 while changing over their rolling states from one to the other, that is, from the state wherein they roll as the loaded ball train 44 to the state wherein they roll as the non-loaded ball train 45, and vice versa.

As described above, in the cross-linear slide bearing unit in accordance with the invention, the wall thickness $T_1$ of the solid portion 2 is substantially equal to the wall thickness $T_2$ of the recesses 10, 11 as well as the wall thickness $T_3$ of the track rails 40, 41, as clearly shown in FIG. 3, for example. It is, consequently, possible to reduce the wall thickness of the bearing unit as a whole, which advantageously makes it possible to minimize inertia force produced when the bearing unit moves.

Further, since the upper and lower track rails in accordance with the invention have a relatively wide width, a multiplicity of through holes for receiving set bolts can be bored in two rows in both side edges of each track rail. Accordingly, it is possible to reliably secure the lower track rail to the bed of a machine tool or the like and also a table or the like to the upper track rail.

It is to be noted that although the above-described cross-linear slide bearing unit employs no retainer for preventing the balls from falling out, the bearing unit may, of course, employ retainers.

FIGS. 7 and 8 in combination show a second embodiment of the cross-linear slide bearing unit in accordance with the invention.

The following is a description of the second embodiment in which the same portions as those found in the first embodiment are denoted by the same reference numerals.

Referring now to FIG. 7, a through hole 50 of any desired shape is formed in an approximately central portion of a solid portion 2a of a bearing body 1a. The width of the through hole 50 is substantially equal to the width of track rails 40a, 41a which are incorporated in the bearing body 1a.

Further, windows or slits 51, 52 are respectively formed in the central portions of the track rails 40a, 41a. Although the shape of the windows or slits is not specifically limited, it is preferable that a rectangular or elliptical window or slit should be formed in parallel to the longitudinal axis of each of the track rails 40a, 41a.

Since the bearing body 1a is provided with the through hole and each track rail is provided with the window or slit as described above, it is possible to reduce the weight of the bearing unit as a whole. In addition, the provision of the through hole and the windows or slits permits a mutual communication bore to be constantly formed through the track rails crossing each other at right angles and the bearing body which retains and guides these track rails. Accordingly, it is possible to easily confirm the position of, for example, a table moving in the X-Y directions by, for example, utilizing a ray of light emitted from a light source placed above or below the bearing unit. Thus, the invention provides a cross-linear slide bearing unit which is most suitable for use in the feed device of a precision apparatus requiring fine or precise feed.

What is claimed is:

1. A cross-linear slide bearing unit comprising:
   first and second track rails, each formed of a longitudinally extending elongated plate of substantially rectangular cross-section, said track rails being disposed in vertically spaced and crossing relation to each other and each track rail provided at opposite sides thereof with a pair of loaded ball grooves, respectively;

a bearing body formed of a substantially flat plate-like block of a small thickness having two opposed flat surfaces, said bearing body being provided at one flat surface thereof with a first shallow rectilinear recess of rectangular cross-section into which said first track rail is slidably fit, and at the other flat surface thereof with a second shallow rectilinear recess of rectangular cross-section which is in crossing relation to said first recess, and into which said second track rail is slidably fit, said bearing body being provided at opposite sides of said first recess with a pair of loaded ball guide grooves respectively facing said loaded ball grooves in said first track rail, and at opposite sides of said second recess with a pair of loaded ball guide grooves respectively facing said loaded ball grooves in said second track rail, said bearing body further having a pair of first non-loaded ball guide bores, each formed therethrough in parallel relation to the corresponding first loaded ball guide grooves in said bearing body, and a pair of second non-loaded ball guide bores, each formed therethrough in parallel relation to the corresponding second loaded ball guide grooves in said bearing body; and four end plates respectively mounted to four sides of said bearing body, each end plate having an inner surface with a ball guiding U-groove for providing communication between said non-loaded ball guide bores and the corresponding loaded ball guide grooves.

2. A cross-linear slide bearing unit according to claim 1, wherein said bearing body has an approximately central portion with a through hole of any desired shape, and said track rails are respectively formed with windows which communicate with said through hole.

3. A cross-linear slide bearing unit according to claim 2, wherein said through hole is substantially square or circular.

4. A cross-linear slide bearing unit according to claim 2, wherein said windows of said track rails are formed into rectangles or ellipses which are parallel to the respective longitudinal axes of said track rails.

* * * * *